United States Patent
Lee

(10) Patent No.: US 8,712,656 B2
(45) Date of Patent: Apr. 29, 2014

(54) BICYCLE SHIFTING METHOD

(71) Applicant: Giant Manufacturing Co., Ltd., Taichung (TW)

(72) Inventor: Kun-Hui Lee, Taichung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 0 days.

(21) Appl. No.: 14/033,522

(22) Filed: Sep. 23, 2013

(65) Prior Publication Data
US 2014/0088846 A1    Mar. 27, 2014

(30) Foreign Application Priority Data
Sep. 24, 2012  (TW) .............................. 101134924 A

(51) Int. Cl.
G06F 7/00       (2006.01)
(52) U.S. Cl.
USPC .......................................................... 701/60
(58) Field of Classification Search
None
See application file for complete search history.

(56) References Cited

U.S. PATENT DOCUMENTS 5,364,271 A *  11/1994  Aknin et al. ..................... 434/61
2004/0090040 A1*  5/2004  Pearson ..................... 280/288.4

* cited by examiner

Primary Examiner — Thomas Tarcza
Assistant Examiner — Adam Alharbi
(74) Attorney, Agent, or Firm — Jianq Chyun IP Office

(57) ABSTRACT

A bicycle shifting method suitable for controlling a gear ratio of a front chain ring and a rear chain ring of the bicycle is provided. The bicycle has a front electronic derailleur, a rear electronic derailleur, a controller, and a controlling switch, and the controller stores a gear-ratio table. The bicycle shifting method includes following steps. The controlling switch is triggered to generate a corresponding signal. One or both of the electronic derailleurs are controlled by the controller according the signal. When the signal is a speed-increasing signal, the controller controls the electronic derailleurs to increase the gear ratio along a speed-increasing path of the gear-ratio table. When the signal is a laborsaving signal, the controller controls the electronic derailleurs to decrease the gear ratio along a laborsaving path of the gear-ratio table. The speed-increasing path is different from the laborsaving path.

9 Claims, 2 Drawing Sheets

FIG. 3

| Front/Rear | 11 | 12 | 13 | 14 | 15 | 17 | 19 | 21 | 24 | 28 |
|---|---|---|---|---|---|---|---|---|---|---|
| 34 | 3.09 | 2.83 | 2.62 | 2.43 | 2.27 | 2.00 | 1.79 | 1.62 | 1.42 | 1.21 |
| 50 | 4.55 | 4.17 | 3.85 | 3.57 | 3.33 | 2.94 | 2.63 | 2.38 | 2.08 | 1.79 |

FIG. 4

| Front/Rear | 11 | 13 | 15 | 17 | 19 | 21 | 24 | 28 | 32 | 36 |
|---|---|---|---|---|---|---|---|---|---|---|
| 24 | 2.18 | 1.85 | 1.60 | 1.41 | 1.26 | 1.14 | 1.00 | 0.86 | 0.75 | 0.67 |
| 32 | 2.91 | 2.46 | 2.13 | 1.88 | 1.68 | 1.52 | 1.33 | 1.14 | 1.00 | 0.89 |
| 42 | 3.82 | 3.23 | 2.80 | 2.47 | 2.21 | 2.00 | 1.75 | 1.50 | 1.31 | 1.17 |

FIG. 5

| Front/Rear | 11 | 12 | 13 | 14 | 15 | 17 | 19 | 21 | 24 | 28 |
|---|---|---|---|---|---|---|---|---|---|---|
| 34 | 3.09 | 2.83 | 2.62 | 2.43 | 2.27 | 2.00 | 1.79 | 1.62 | 1.42 | 1.21 |
| 50 | 4.55 | 4.17 | 3.85 | 3.57 | 3.33 | 2.94 | 2.63 | 2.38 | 2.08 | 1.79 |

FIG. 6

| Front/Rear | 11 | 13 | 15 | 17 | 19 | 21 | 24 | 28 | 32 | 36 |
|---|---|---|---|---|---|---|---|---|---|---|
| 24 | 2.18 | 1.85 | 1.60 | 1.41 | 1.26 | 1.14 | 1.00 | 0.86 | 0.75 | 0.67 |
| 32 | 2.91 | 2.46 | 2.13 | 1.88 | 1.68 | 1.52 | 1.33 | 1.14 | 1.00 | 0.89 |
| 42 | 3.82 | 3.23 | 2.80 | 2.47 | 2.21 | 2.00 | 1.75 | 1.50 | 1.31 | 1.17 |

BICYCLE SHIFTING METHOD

CROSS-REFERENCE TO RELATED APPLICATION

This application claims the priority benefits of Taiwan application serial no. 101134924, filed on Sep. 24, 2012. The entirety of the above-mentioned patent applications is hereby incorporated by reference herein and made a part of this specification.

BACKGROUND OF THE INVENTION

1. Field of the Invention

The invention relates to a shifting method and particularly to a bicycle shifting method.

2. Description of Related Art

In recent years, the market for bicycles has been growing, and thus consumers are not only interested in the recreational road bicycles but also fond of the high-end racing bicycles. Generally, the bicycles are equipped with derailleurs, so as to move the chain onto different chain rings according to different terrain requirements and various consumers' needs. The derailleurs include front and rear derailleurs respectively controlling the locations of the chain on the front and rear chain rings. Due to the difference in frame structures or shifting cables, the bicycles may have different derailleurs. In addition to the mechanical derailleurs, various bicycles are equipped with electronic derailleurs.

The bicycle may be shifted by switching the location of the chain on the chain rings, and the shifting effect is relevant to the gear ratio of the front chain ring and the rear chain ring where the chain is located. The gear ratios of all front and rear chain rings of a bicycle are sequentially organized into a gear-ratio table, and the gear-ratio table is conducive to a user who intends to sequentially switch the location of the chain to be on different chain rings according to the gear-ratios. Conventionally, the speed of the bicycle is often changed in a manual manner, i.e., the controlling switch is manually adjusted to enable the front and rear derailleurs to simultaneously change the location of the chain on the first and rear chain rings. Said operation is rather complicated.

At present, in order to change the speed of the bicycle, an electronic system is often applied to adjust the controlling switch, and the controlling switch has been simplified to be a two-way switch including a speed-increasing way and a laborsaving way. Besides, a controller may be employed to control the gear ratio of the bicycle with ease. However, when the derailleurs are controlled to sequentially change the location of the chain on the chain rings according to the gear ratio, the shifting action is sometimes performed around the same location. At this time, if the adjustment of the gear ratio requires the simultaneous change to the locations of the chain on the front and rear chain rings, the repetitive changing actions may cause the front and rear derailleurs to move the chain to a great extent. Thereby, the rider's pedaling action is not smooth, and the shifting parts are likely to be damaged.

SUMMARY OF THE INVENTION

The invention is directed to a bicycle shifting method to guarantee the riding comfort and reduce possible damages to shifting parts.

In an embodiment of the invention, a bicycle shifting method suitable for controlling a gear ratio of a front chain ring and a rear chain ring of a bicycle is provided. The bicycle has a front electronic derailleur, a rear electronic derailleur, a controller, and a controlling switch, and the controller stores a gear-ratio table. The shifting method includes following steps. The controlling switch is triggered to generate a corresponding signal. The front electronic derailleur, the rear electronic derailleur, or both of the front electronic derailleur and the rear electronic derailleur are controlled by the controller according to the signal. When the signal is a speed-increasing signal, the controller controls the front electronic derailleur, the rear electronic derailleur, or both of the front electronic derailleur and the rear electronic derailleur, so as to increase the gear ratio along a speed-increasing path of the gear-ratio table. When the signal is a laborsaving signal, the controller controls the front electronic derailleur, the rear electronic derailleur, or both of the front electronic derailleur and the rear electronic derailleur, so as to decrease the gear ratio along a laborsaving path of the gear-ratio table. The speed-increasing path is different from the laborsaving path.

According to an embodiment of the invention, the bicycle has a plurality of the front chain rings and a plurality of the rear chain rings respectively controlled by the front electronic derailleur and the rear electronic derailleur. The bicycle has a chain located on one of the front chain rings and one of the rear chain rings, and the step of controlling the front electronic derailleur, the rear electronic derailleur, or both of the front electronic derailleur and the rear electronic derailleur by the controller according to the signal includes: controlling the front electronic derailleur to move the chain from the one of the front chain rings to another one of the front chain rings, controlling the rear electronic derailleur to move the chain from the one of the rear chain rings to another one of the rear chain rings, or simultaneously controlling the front electronic derailleur to move the chain from the one of the front chain rings to another one of the front chain rings and controlling the rear electronic derailleur to move the chain from the one of the rear chain rings to another one of the rear chain rings.

According to an embodiment of the invention, the speed-increasing path has a first switch point, and the step of controlling the front electronic derailleur, the rear electronic derailleur, or both of the front electronic derailleur and the rear electronic derailleur by the controller according to the signal includes: controlling the rear electronic derailleur to move the chain along the speed-increasing path from the one of the rear chain rings to another one of the rear chain rings; at the first switch point, controlling the front electronic derailleur to move the chain from the one of the front chain rings to another one of the front chain rings.

According to an embodiment of the invention, the laborsaving path has a second switch point, and the step of controlling the front electronic derailleur, the rear electronic derailleur, or both of the front electronic derailleur and the rear electronic derailleur by the controller according to the signal includes: controlling the rear electronic derailleur to move the chain along the laborsaving path from the one of the rear chain rings to another one of the rear chain rings; at the second switch point, controlling the front electronic derailleur to move the chain from the one of the front chain rings to another one of the front chain rings. Here, the first switch point is different from the second switch point.

According to an embodiment of the invention, the chain is on one of the rear chain rings at the first switch point, and the chain is on another one of the rear chain rings at the second switch point.

According to an embodiment of the invention, the speed-increasing path has a first switch point, and the step of controlling the front electronic derailleur, the rear electronic derailleur, or both of the front electronic derailleur and the rear electronic derailleur by the controller according to the signal comprises: controlling the rear electronic derailleur to move the chain along the speed-increasing path from the one of the rear chain rings to another one of the rear chain rings; at the first switch point, controlling the front electronic derailleur to move the chain from the one of the front chain rings to another one of the front chain rings and controlling the rear electronic derailleur to move the chain from the one of the rear chain rings to another one of the rear chain rings.

According to an embodiment of the invention, the step of controlling the rear electronic derailleur to move the chain from the one of the rear chain rings to another one of the rear chain rings at the first switch point includes moving the chain along the speed-increasing path from the one of the rear chain rings to another one of the rear chain rings with more gears than those of the one of the rear chain rings.

According to an embodiment of the invention, the laborsaving path has a second switch point, and the step of controlling the front electronic derailleur, the rear electronic derailleur, or both of the front electronic derailleur and the rear electronic derailleur by the controller according to the signal includes: controlling the rear electronic derailleur to move the chain along the laborsaving path from the one of the rear chain rings to another one of the rear chain rings; at the second switch point, controlling the front electronic derailleur to move the chain from the one of the front chain rings to another one of the front chain rings and controlling the rear electronic derailleur to move the chain from the one of the rear chain rings to another one of the rear chain rings. Here, the first switch point is different from the second switch point.

According to an embodiment of the invention, the step of controlling the rear electronic derailleur to move the chain from the one of the rear chain rings to another one of the rear chain rings at the second switch point includes moving the chain along the laborsaving path from the one of the rear chain rings to another one of the rear chain rings with less gears than those of the one of the rear chain rings.

According to an embodiment of the invention, the chain is on one of the rear chain rings at the first switch point, and the chain is on another one of the rear chain rings at the second switch point.

In view of the above, a bicycle shifting method suitable for controlling a gear ratio of a bicycle is provided. According to the bicycle shifting method, the controller storing the gear-ratio table controls the front electronic derailleur, the rear electronic derailleur, or both of the front electronic derailleur and the rear electronic derailleur based on the signal generated by triggering the controlling switch, so as to increase the gear ratio along the speed-increasing path of the gear-ratio table or decrease the gear ratio along the laborsaving path of the gear-ratio table. Note that the speed-increasing path is different from the laborsaving path. By applying the bicycle shifting method, possible damages to shifting parts during the shifting operation of the bicycle may be reduced, and the riding comfort may be guaranteed.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

FIG. 3 is a schematic view illustrating the gear-ratio table depicted in FIG. 2.

FIG. 4 is a schematic view illustrating a gear-ratio table according to another embodiment of the invention.

FIG. 5 is a schematic view illustrating a gear-ratio table according to yet another embodiment of the invention.

FIG. 6 is a schematic view illustrating a gear-ratio table according to yet another embodiment of the invention.

DETAILED DESCRIPTION OF DISCLOSED EMBODIMENTS

Figure 1:
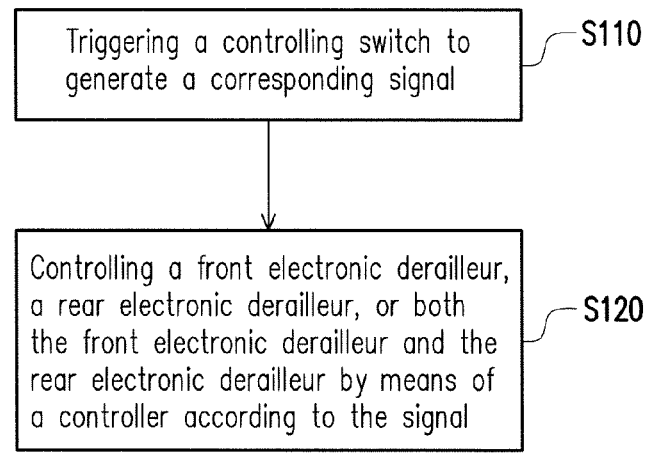
FIG. 1 is a flow chart illustrating a bicycle shifting method according to an embodiment of the invention.

FIG. 1 is a flow chart illustrating a bicycle shifting method according to an embodiment of the invention. With reference to FIG. 1, in the present embodiment, the bicycle shifting method includes following steps. In step S110, a controlling switch is triggered to generate a corresponding signal. In step S120, a front electronic derailleur, a rear electronic derailleur, or both of the front electronic derailleur and the rear electronic derailleur are controlled by a controller according to the signal. Accordingly, the bicycle shifting method is suitable for controlling a gear ratio of a front chain ring and a rear chain ring of the bicycle.

Figure 2:
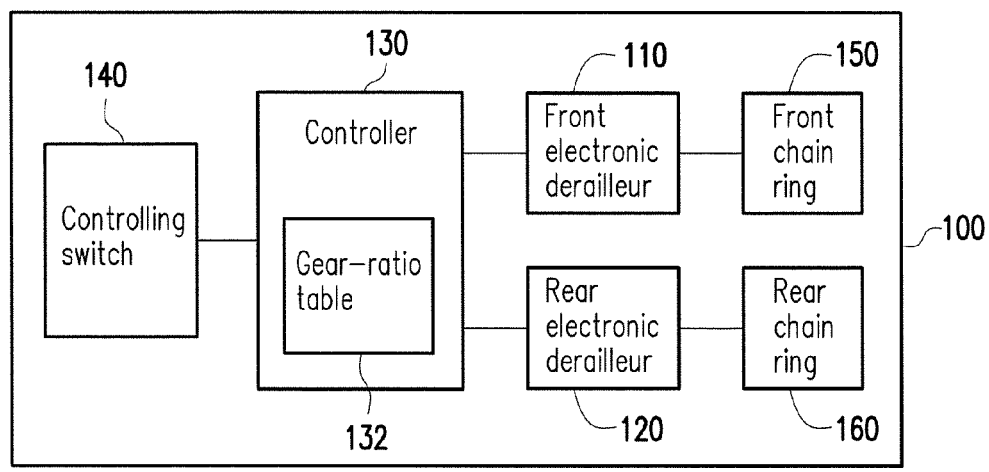
FIG. 2 is a schematic diagram of a bicycle according to an embodiment of the invention.

FIG. 2 is a schematic diagram of a bicycle according to an embodiment of the invention. With reference to FIG. 2, in the present embodiment, the bicycle 100 has a front electronic derailleur 110, a rear electronic derailleur 120, a controller 130, and a controlling switch 140. The controller 130 stores a gear-ratio table 132. Hence, the controller 130 is able to refer to the gear-ratio table 132 according to the signal generated by the controlling switch 140 and control the front electronic derailleur 110, the rear electronic derailleur 120, or both of the front electronic derailleur 110 and the rear electronic derailleur 120 according to the gear-ratio table 132.

FIG. 3 is a schematic view illustrating the gear-ratio table depicted in FIG. 2. Please refer to both FIG. 2 and FIG. 3. In the present embodiment, the bicycle 100 has a plurality of front chain rings 150 and a plurality of rear chain rings 160 respectively controlled by the front electronic derailleur 110 and the rear electronic derailleur 120. Each of the front chain rings 150 and the rear chain rings 160 has different numbers of gears. For instance, the bicycle 100 described in the present embodiment has two front chain rings 150 and ten rear chain rings 160. The two front chain rings 150 respectively have 34 gears and 50 gears, and the ten rear chain rings 160 respectively have 11 gears, 12 gears, 13 gears, 14 gears, 15 gears, 17 gears, 19 gears, 21 gears, 24 gears, and 28 gears, which should however not be construed as limitations to the invention.

Besides, the bicycle 100 has a chain located on one of the front chain rings 150 and one of the rear chain rings 160. Therefore, the aforesaid gear ratio of the bicycle 100 may be considered as the gear ratio of the front and rear chain rings 150 and 160 where the chain is located. When the chain is located on another one of the front chain rings 150 and another one of the rear chain rings 160, the gear ratio of the bicycle 100 may also be changed. For instance, when the chain is located on the front chain ring 150 having 34 gears and on the rear chain ring 160 having 11 gears, the gear ratio of the bicycle 100 is approximately 3.09. Hence, the bicycle shifting method described herein is conducted by changing the front and rear chain rings 150 and 160 where the chain is located, so as to control the gear ratio of the bicycle 100. The bicycle shifting method is elaborated hereinafter with reference to FIG. 1 to FIG. 3.

In step S110, the controlling switch 140 is triggered to generate a corresponding signal. The signal includes a speed-increasing signal and a laborsaving signal. The controlling switch 140 may be set on the handle of the bicycle 100, which should not be construed as a limitation to the invention. Based on actual conditions, a user may trigger the controlling switch 140 to generate the speed-increasing signal or the laborsaving signal, such that the controller 130 may control the bicycle 100 according to the signal and increase/decrease the gear ratio.

In step S120, the controller 130 controls the front electronic derailleur 110, the rear electronic derailleur 120, or both of the front electronic derailleur 110 and the rear electronic derailleur 120 according to the signal. Here, the controller 130 is able to control the front electronic derailleur 110 only, the rear electronic derailleur 120 only, or both of the front electronic derailleur 110 and the rear electronic derailleur 120 according to the signal. Namely, in this step, the controller 130 may, according to the signal, control one or both of the electronic derailleurs.

With reference to FIG. 3, when the signal is a speed-increasing signal, the controller 130 controls the electronic derailleurs to increase the gear ratio of the bicycle 100 along a speed-increasing path P11 of the gear-ratio table 132. When the signal is a laborsaving signal, the controller 130 controls the electronic derailleurs to decrease the gear ratio of the bicycle 100 along a laborsaving path P12 of the gear-ratio table 132.

Specifically, in the present embodiment, the step of controlling the front electronic derailleur 110 includes controlling the front electronic derailleur 110 to move the chain from one of the front chain rings 150 to another one of the front chain rings 150, and the step of controlling the rear electronic derailleur 120 includes controlling the rear electronic derailleur 120 to move the chain from one of the rear chain rings 160 to another one of the rear chain rings 160. When the controller 130 controls the electronic derailleurs at the same time, the electronic derailleurs respectively move the chain from one of the front chain rings 150 to another one of the front chain rings 150 and from one of the rear chain rings 160 to another one of the rear chain rings 160.

According to the present embodiment, the speed-increasing path P11 has a first switch point C11, and the step of controlling the electronic derailleurs includes: controlling the rear electronic derailleur 120 to move the chain along the speed-increasing path P11 from one of the rear chain rings 160 to another one of the rear chain rings 160; at the first switch point C11, controlling the front electronic derailleur 110 to move the chain from one of the front chain rings 150 to another one of the front chain rings 150.

Besides, in the present embodiment, the laborsaving path P12 has a second switch point C12, and the step of controlling the electronic derailleurs includes: controlling the rear electronic derailleur 120 to move the chain along the laborsaving path P12 from one of the rear chain rings 160 to another one of the rear chain rings 160; at the second switch point C12, controlling the front electronic derailleur 110 to move the chain from one of the front chain rings 150 to another one of the front chain rings 150. Here, the first switch point C11 is different from the second switch point C12. To be specific, the chain is on one of the rear chain rings 160 at the first switch point C11, and the chain is on another one of the rear chain rings 160 at the second switch point C12 (i.e., the rear chain ring 160 where the chain is located at the first switch point C11 is different from the rear chain ring 160 where the chain is located at the second switch point C12). The following explanations are provided with reference to FIG. 3.

With reference to FIG. 3, for instance, when the chain is located on the front chain ring 150 having 34 gears and on the rear chain ring 160 having 28 gears, the gear ratio is approximately 1.21. At this time, When the signal is the speed-increasing signal, the controller 130 controls the rear electronic derailleur 120 to move along the speed-increasing path P11 from the rear chain ring 160 having 28 gears to the rear chain ring 160 having 24 gears. Thereby, the gear ratio is increased to 1.42.

Similarly, when the chain is located on the front chain ring 150 having 34 gears and on the rear chain ring 160 having 24 gears, and the signal is the speed-increasing signal, the controller 130 controls the rear electronic derailleur 120 to move along the speed-increasing path P11 to the rear chain ring 160 having 21 gears. Thereby, the gear ratio is increased to 1.62.

Besides, in the present embodiment, at the first switch point C11, the front chain ring 150 has 34 gears, and the rear chain ring 160 has 13 gears. Hence, when the chain is at the first switch point C11, and the signal is the speed-increasing, the controller 130 controls the front electronic derailleur 110 to move along the speed-increasing path P11 from the front chain ring 150 having 34 gears to the front chain ring 150 having 50 gears. Thereby, the gear ratio is increased from 2.62 to 3.85.

By contrast, when the chain is located on the front chain ring 150 having 50 gears and on the rear chain ring 160 having 13 gears, and the signal is the laborsaving signal, the controller 130 does not control the front electronic derailleur 110 to move along the speed-increasing path P11 back to the front chain ring 150 having 34 gears. As a matter of fact, the controller 130 controls the rear electronic derailleur 120 to move along the laborsaving path P12 from the rear chain ring 160 having 13 gears to the rear chain ring 160 having 14 gears, such that the gear ratio is reduced from 3.85 to 3.57.

Similarly, when the chain is located on the front chain ring 150 having 50 gears and on the rear chain ring 160 having 14 gears, and the signal is the laborsaving signal, the controller 130 controls the rear electronic derailleur 120 to move along the laborsaving path P12 to the rear chain ring 160 having 15 gears, so as to reduce the gear ratio to 3.33.

When the chain is at the second switch point C12, i.e., when the chain is located on the front chain ring 150 having 50 gears and on the rear chain ring 150 having 21 gears, and the signal is the laborsaving signal, the controller 130 controls the front electronic derailleur 110 to move along the laborsaving path P12 from the front chain ring 150 having 50 gears to the front chain ring 150 having 34 gears. Thereby, the gear ratio is decreased from 2.38 to 1.62.

After that, when the controller 130 receives the speed-increasing signal, the controller 130 controls the rear electronic derailleur 120 to move along the speed-increasing path P11 from the rear chain ring 160 having 21 gears to the rear chain ring 160 having 19 gears, such that the gear ratio is increased from 1.62 to 1.79.

In light of the foregoing, when the controller 130 described herein controls the electronic derailleurs along the speed-increasing path P11 or the laborsaving path P12, the controller 130 controls the gear ratio mostly by controlling the rear electronic derailleur 120. When the controller 130 arrives at the first switch point C11 or the second switch point C12 along the speed-increasing path P11 or the laborsaving path P12, the controller 130 controls the gear ratio by controlling the front electronic derailleur 110. Therefore, according to the bicycle shifting method, only the controller 130 is applied to control one of the front and rear electronic derailleurs 110 and 120 during the shifting process, so as to prevent vibration of the bicycle 100 and guarantee rider's comfort during the shifting process.

Additionally, in the bicycle shifting method, the switching action may be performed along two different paths, i.e., the speed-increasing path P11 is different from the laborsaving path P12. When the bicycle 100 back and forth switches the front chain ring 150 and the rear chain ring 160 where the chain is located to increase or decrease the gear ratio, the controller 130 is able to switch the front chain ring 150 or the rear chain ring 160 where the chain is located along the speed-increasing path P11 or the laborsaving path P12. As such, in the bicycle shifting method, when the controller 130 frequently adjusts the gear ratio by controlling the derailleurs back and forth, damages to the shifting parts may be reduced.

FIG. 4 is a schematic view illustrating a gear-ratio table according to another embodiment of the invention. With reference to FIG. 4, in the present embodiment, the bicycle has three front chain rings 150 and ten rear chain rings 160. The three front chain rings 150 respectively have 24 gears, 32 gears and 42 gears, and the ten rear chain rings 160 respectively have 11 gears, 13 gears, 15 gears, 17 gears, 19 gears, 21 gears, 24 gears, 28 gears, 32 gears, and 36 gears, which should however not be construed as limitations to the invention.

The bicycle shifting method described in the present embodiment in FIG. 4 is similar to the bicycle shifting method described in the above embodiment in FIG. 3. For instance, when the chain is located on the front chain ring 150 having 24 gears and on the rear chain ring 160 having 36 gears, and the signal is the speed-increasing signal, the controller 130 controls the rear electronic derailleur 120 to move along the speed-increasing path P21 from the rear chain ring 160 having 36 gears to the rear chain ring 160 having 32 gears, so as to increase the gear ratio from 0.67 to 0.75.

In addition, according to the present embodiment, the speed-increasing path P21 has two first switch points C21. When the chain is at one of the two first switch points C21 and located on the front chain ring 150 having 24 gears and on the rear chain ring 160 having 15 gears, and the signal is the speed-increasing signal, the controller 130 controls the front electronic derailleur 110 to move along the speed-increasing path P21 from the front chain ring 150 having 24 gears to the front chain ring 150 having 32 gears, so as to increase the gear ratio from 1.60 to 2.13.

Similarly, when the chain is at one of the two first switch points C21 and located on the front chain ring 150 having 32 gears and on the rear chain ring 160 having 13 gears, and the signal is the speed-increasing signal, the controller 130 controls the front electronic derailleur 110 to move along the speed-increasing path P21 from the front chain ring 150 having 32 gears to the front chain ring 150 having 42 gears, so as to increase the gear ratio from 2.46 to 3.23.

By contrast, when the chain is located on the front chain ring 150 having 42 gears and on the rear chain ring 160 having 13 gears, and the signal is the laborsaving signal, the controller 130 does not control the front electronic derailleur 110 to move along the speed-increasing path P21 back to the front chain ring 150 having 32 gears. As a matter of fact, the controller 130 controls the rear electronic derailleur 120 to move along the laborsaving path P22 from the rear chain ring 160 having 13 gears to the rear chain ring 160 having 15 gears, such that the gear ratio is reduced from 3.23 to 2.80.

Since the bicycle described in the present embodiment has three front chain rings 150, the gear-ratio table 132 further includes an assistant path P23. When the chain is at one of the two first switch points C21 and located on the front chain ring 150 having 32 gears and on the rear chain ring 160 having 15 gears, and the signal is the laborsaving signal, the controller 130 does not control the front electronic derailleur 110 to move along the speed-increasing path P21 back to the front chain ring 150 having 24 gears. As a matter of fact, the controller 130 controls the rear electronic derailleur 120 to move along the assistant path P23 from the rear chain ring 160 having 15 gears to the rear chain ring 160 having 17 gears, such that the gear ratio is reduced from 2.13 to 1.88.

According to the present embodiment, the laborsaving path P22 has two second switch points C22. When the chain is at one of the two second switch points C22 and located on the front chain ring 150 having 42 gears and on the rear chain ring 160 having 28 gears, and the signal is the laborsaving signal, the controller 130 controls the front electronic derailleur 110 to move along the laborsaving path P22 from the front chain ring 150 having 42 gears to the front chain ring 150 having 32 gears, so as to decrease the gear ratio from 1.50 to 1.14.

Similarly, when the chain is at one of the two second switch points C22 and located on the front chain ring 150 having 32 gears and on the rear chain ring 160 having 32 gears, and the signal is the laborsaving signal, the controller 130 controls the front electronic derailleur 110 to move along the laborsaving path P22 from the front chain ring 150 having 32 gears to the front chain ring 150 having 24 gears, so as to decrease the gear ratio from 1.00 to 0.75.

After that, when the controller 130 receives the speed-increasing signal, the controller 130 controls the rear electronic derailleur 120 to move along the speed-increasing path P21 from the rear chain ring 160 having 32 gears to the rear chain ring 160 having 28 gears, such that the gear ratio is increased from 0.75 to 0.86.

In light of the foregoing, when the controller 130 described herein controls the electronic derailleurs along the speed-increasing path P21 or the laborsaving path P22, the controller 130 controls the gear ratio mostly by controlling the rear electronic derailleur 120. When the controller 130 arrives at one of the first switch points C21 or one of the second switch points C22 along the speed-increasing path P21 or the laborsaving path P22, the controller 130 controls the gear ratio by controlling the front electronic derailleur 110. Therefore, according to the bicycle shifting method, only the controller 130 is applied to control one of the front and rear electronic derailleurs 110 and 120 during the shifting process, so as to prevent vibration of the bicycle and guarantee rider's comfort during the shifting process.

Additionally, in the bicycle shifting method, the switching action may be performed along two different paths, i.e., the speed-increasing path P21 is different from the laborsaving path P22. When the bicycle back and forth switches the front chain ring 150 and the rear chain ring 160 where the chain is located to increase or decrease the gear ratio, the controller 130 is able to switch the front chain ring 150 or the rear chain ring 160 where the chain is located along the speed-increasing path P21 or the laborsaving path P22. As such, in the bicycle shifting method, when the controller 130 frequently adjusts the gear ratio by controlling the electronic derailleurs back and forth, damages to the shifting parts may be reduced.

FIG. 5 is a schematic view illustrating a gear-ratio table according to yet another embodiment of the invention. With reference to FIG. 5, in the present embodiment, the bicycle has two front gears 150 and ten back gears 160. The two front chain rings 150 respectively have 34 gears and 50 gears, and the ten rear chain rings 160 respectively have 11 gears, 12 gears, 13 gears, 14 gears, 15 gears, 17 gears, 19 gears, 21 gears, 24 gears, and 28 gears, which should however not be construed as limitations to the invention.

According to the present embodiment, the speed-increasing path P31 has a first switch point C31, and the step of controlling the electronic derailleurs includes: controlling the rear electronic derailleur 120 to move the chain along the speed-increasing path P31 from one of the rear chain rings 160 to another one of the rear chain rings 160; at the first switch point C31, controlling the front electronic derailleur 110 to move the chain from one of the front chain rings 150 to another one of the front chain rings 150 and controlling the rear electronic derailleur 120 to move the chain from one of the rear chain rings 160 to another one of the rear chain rings 160.

In addition, the laborsaving path P32 described herein has a second switch point C32, and the step of controlling the electronic derailleurs includes: controlling the rear electronic derailleur 120 to move the chain along the laborsaving path P32 from one of the rear chain rings 160 to another one of the rear chain rings 160; at the second switch point C32, controlling the front electronic derailleur 110 to move the chain from one of the front chain rings 150 to another one of the front chain rings 150 and controlling the rear electronic derailleur 120 to move the chain from one of the rear chain rings 160 to another one of the rear chain rings 160.

In view of the above, the controller 130 at the first switch point C31 or the second switch point C32 controls both the front electronic derailleur 110 and the rear electronic derailleur 120 at the same time, and the first switch point C31 is different from the second switch point C32. To be specific, the chain is on one of the rear chain rings 160 at the first switch point C31, and the chain is on another one of the rear chain rings 160 at the second switch point C32 (i.e., the rear chain ring 160 where the chain is located at the first switch point C11 is different from the rear chain ring 160 where the chain is located at the second switch point C12).

Besides, in the present embodiment, the step of controlling the rear electronic derailleur 120 to move the chain from one of the rear chain rings 160 to another one of the rear chain rings 160 at the first switch point C31 includes moving the chain along the speed-increasing path P31 from one of the rear chain rings 160 to another one of the rear chain rings 160 having more gears than those of the one of the rear chain rings, and the step of controlling the rear electronic derailleur 120 to move the chain from one of the rear chain rings 160 to another one of the rear chain rings 160 at the second switch point C32 includes moving the chain along the laborsaving path P32 from one of the rear chain rings 160 to another one of the rear chain rings 160 having less gears than those of the one of the rear chain rings. Here, the chain is on one of the rear chain rings 160 at the first switch point C31, and the chain is on another one of the rear chain rings 160 at the second switch point C32. The following explanations are provided with reference to FIG. 5.

With reference to FIG. 5, for instance, when the chain is located on the front chain ring 150 having 34 gears and on the rear chain ring 160 having 28 gears, and the signal is the speed-increasing signal, the controller 130 controls the rear electronic derailleur 120 to move along the speed-increasing path P31 to the rear chain ring 160 having 24 gears, so as to reduce the gear ratio from 1.21 to 1.42.

Similarly, when the chain is at one of the first switch point C31, i.e., when the chain is located on the front chain ring 150 having 34 gears and on the rear chain ring 160 having 13 gears, and the signal is the speed-increasing signal, the controller 130 controls the front electronic derailleur 110 to move along the speed-increasing path P31 to the front chain ring 150 having 50 gears and simultaneously controls the rear electronic derailleur 120 to move to the rear chain ring 160 having 15 gears, so as to increase the gear ratio from 2.62 to 3.33.

By contrast, when the chain is located on the front chain ring 150 having 50 gears and on the rear chain ring 160 having 15 gears, and the signal is the laborsaving signal, the controller 130 does not control the front electronic derailleur 110 and the rear electronic derailleur 120 to move along the speed-increasing path P31 back to the front chain ring 150 having 34 gears and to the rear chain ring 160 having 13 gears, respectively. As a matter of fact, the controller 130 controls the rear electronic derailleur 120 to move along the laborsaving path P32 from the rear chain ring 160 having 15 gears to the rear chain ring 160 having 17 gears, such that the gear ratio is reduced from 3.33 to 2.94.

Additionally, when the chain is at the second switch point C32, i.e., when the chain is located on the front chain ring 150 having 50 gears and on the rear chain ring 160 having 21 gears, and the signal is the laborsaving signal, the controller 130 controls the front electronic derailleur 110 to move along the laborsaving path P32 to the front chain ring 150 having 34 gears and simultaneously controls the rear electronic derailleur 120 to move to the rear chain ring 160 having 17 gears, so as to decrease the gear ratio from 2.38 to 2.00.

After that, when the controller 130 receives the speed-increasing signal, the controller 130 controls the rear electronic derailleur 120 to move along the speed-increasing path P31 from the rear chain ring 160 having 17 gears to the rear chain ring 160 having 15 gears, such that the gear ratio is increased from 2.00 to 2.27.

In light of the foregoing, when the controller 130 described herein controls the electronic derailleurs along the speed-increasing path P31 or the laborsaving path P32, the controller 130 controls the gear ratio mostly by controlling the rear electronic derailleur 120. When the controller 130 arrives at the first switch point C31 or the second switch point C32 along the speed-increasing path P31 or the laborsaving path P32, the controller 130 controls the gear ratio by controlling the front electronic derailleur 110 and the rear electronic derailleur 120 simultaneously.

Comparatively speaking, according to the embodiment shown in FIG. 5, the front electronic derailleur 110 and the rear electronic derailleur 120 are simultaneously controlled at the first switch point C31 or the second switch point C32; according to the embodiment shown in FIG. 3, only the front electronic derailleur 110 is controlled at the first switch point C11 or the second switch point C12. Hence, according to the embodiment shown in FIG. 5, the difference in the gear ratio before and after the first switch point C31 and the difference in the gear ratio before and after the second switch point C32 are rather small; according to the embodiment shown in FIG. 3, the difference in the gear ratio before and after the first switch point C11 and the difference in the gear ratio before and after the second switch point C12 are rather large. It can be concluded that the gear ratio described in the embodiment shown in FIG. 5 varies in an even manner.

Additionally, in the bicycle shifting method, the switching action may be performed along two different paths, i.e., the speed-increasing path P31 is different from the laborsaving path P32. When the bicycle back and forth switches the front chain ring 150 and the rear chain ring 160 where the chain is located to increase or decrease the gear ratio, the controller 130 is able to switch the front chain ring 150 or the rear chain ring 160 where the chain is located along the speed-increasing path P31 or the laborsaving path P32. As such, in the bicycle shifting method, when the controller 130 frequently adjusts the gear ratio by controlling the derailleurs back and forth, damages to the shifting parts may be reduced.

FIG. 6 is a schematic view illustrating a gear-ratio table according to yet another embodiment of the invention. With reference to FIG. 6, in the present embodiment, the bicycle has three front gears 150 and ten back gears 160. The three front chain rings 150 respectively have 24 gears, 32 gears and 42 gears, and the ten rear chain rings 160 respectively have 11 gears, 13 gears, 15 gears, 17 gears, 19 gears, 21 gears, 24 gears, 28 gears, 32 gears, and 36 gears, which should however not be construed as limitations to the invention.

The bicycle shifting method described in the present embodiment in FIG. 6 is similar to the bicycle shifting method described in the above embodiment in FIG. 5. For instance, when the chain is located on the front chain ring 150 having 24 gears and on the rear chain ring 160 having 36 gears, and the signal is the speed-increasing signal, the controller 130 controls the rear electronic derailleur 120 to move along the speed-increasing path P41 from the rear chain ring 160 having 36 gears to the rear chain ring 160 having 32 gears, so as to increase the gear ratio from 0.67 to 0.75.

In addition, according to the present embodiment, the speed-increasing path P41 has two first switch points C41. When the chain is at one of the two first switch points C41 and located on the front chain ring 150 having 24 gears and on the rear chain ring 160 having 15 gears, and the signal is the speed-increasing signal, the controller 130 controls the front electronic derailleur 110 and the rear electronic derailleur 120 to move along the speed-increasing path P41 to the front chain ring 150 having 32 gears and to the rear chain ring 160 having 17 gears, respectively, so as to increase the gear ratio from 1.60 to 1.88.

Similarly, when the chain is at one of the two first switch points C41 and located on the front chain ring 150 having 32 gears and on the rear chain ring 160 having 13 gears, and the signal is the speed-increasing signal, the controller 130 controls the front electronic derailleur 110 and the rear electronic derailleur 120 to move along the speed-increasing path P41 to the front chain ring 150 having 42 gears and to the rear chain ring 160 having 15 gears, respectively, so as to increase the gear ratio from 2.46 to 2.80.

By contrast, when the chain is located on the front chain ring 150 having 42 gears and on the rear chain ring 160 having 15 gears, and the signal is the laborsaving signal, the controller 130 does not control the front electronic derailleur 110 and the rear electronic derailleur 120 to move along the speed-increasing path P41 back to the front chain ring 150 having 32 gears and to the rear chain ring 160 having 13 gears, respectively. As a matter of fact, the controller 130 controls the rear electronic derailleur 120 to move along the laborsaving path P42 from the rear chain ring 160 having 15 gears to the rear chain ring 160 having 17 gears, such that the gear ratio is reduced from 2.80 to 2.47.

Since the bicycle described in the present embodiment has three front chain rings 150, the gear-ratio table 132 further includes an assistant path P43. By contrast, when the chain is at one of the first switch points C41 and is located on the front chain ring 150 having 32 gears and on the rear chain ring 160 having 17 gears, and the signal is the laborsaving signal, the controller 130 does not control the front electronic derailleur 110 and the rear electronic derailleur 120 to move along the speed-increasing path P41 back to the front chain ring 150 having 24 gears and to the rear chain ring 160 having 15 gears, respectively. As a matter of fact, the controller 130 controls the rear electronic derailleur 120 to move along the assistant path P43 from the rear chain ring 160 having 17 gears to the rear chain ring 160 having 19 gears, such that the gear ratio is reduced from 1.88 to 1.68.

According to the present embodiment, the laborsaving path P42 has two second switch points C42. When the chain is at one of the two second switch points C42 and located on the front chain ring 150 having 42 gears and on the rear chain ring 160 having 28 gears, and the signal is the laborsaving signal, the controller 130 controls the front electronic derailleur 110 and the rear electronic derailleur 120 to move along the laborsaving path P42 to the front chain ring 150 having 32 gears and to the rear chain ring 160 having 24 gears, respectively, so as to decrease the gear ratio from 1.50 to 1.33.

When the chain is at one of the two second switch points C42 and located on the front chain ring 150 having 32 gears and on the rear chain ring 160 having 32 gears, and the signal is the laborsaving signal, the controller 130 controls the front electronic derailleur 110 and the rear electronic derailleur 120 to move along the laborsaving path P42 to the front chain ring 150 having 24 gears and to the rear chain ring 160 having 28 gears, respectively, so as to decrease the gear ratio from 1.00 to 0.86.

After that, when the controller 130 receives the speed-increasing signal, the controller 130 controls the rear electronic derailleur 120 to move along the speed-increasing path P41 from the rear chain ring 160 having 28 gears to the rear chain ring 160 having 24 gears, such that the gear ratio is increased from 0.86 to 1.00.

In light of the foregoing, when the controller 130 described herein controls the electronic derailleurs along the speed-increasing path P41 or the laborsaving path P42, the controller 130 controls the gear ratio mostly by controlling the rear electronic derailleur 120. When the controller 130 arrives at one of the first switch points C41 or one of the second switch points C42 along the speed-increasing path P41 or the laborsaving path P42, the controller 130 controls the gear ratio by controlling the front electronic derailleur 110 and the rear electronic derailleur 120 simultaneously.

Comparatively speaking, according to the embodiment shown in FIG. 6, the front electronic derailleur 110 and the rear electronic derailleur 120 are simultaneously controlled at one of the first switch points C41 or one of the second switch points C42; according to the embodiment shown in FIG. 4, only the front electronic derailleur 110 is controlled at one of the first switch points C21 or one of the second switch points C22. Hence, according to the embodiment shown in FIG. 6, the difference in the gear ratio before and after each first switch point C41 and the difference in the gear ratio before and after each second switch point C42 are rather small; according to the embodiment shown in FIG. 4, the difference in the gear ratio before and after each first switch point C21 and the difference in the gear ratio before and after each second switch point C22 are rather large. It can be concluded that the gear ratio described in the embodiment shown in FIG. 6 varies in an even manner.

Additionally, in the bicycle shifting method, the switching action may be performed along two different paths, i.e., the speed-increasing path P41 is different from the laborsaving path P42. When the bicycle back and forth switches the front chain ring 150 and the rear chain ring 160 where the chain is located to increase or decrease the gear ratio, the controller 130 is able to switch the front chain ring 150 or the rear chain ring 160 where the chain is located along the speed-increasing path P41 or the laborsaving path P42. As such, in the bicycle shifting method, when the controller 130 frequently adjusts the gear ratio by controlling the derailleurs back and forth, damages to the shifting parts may be reduced.

To sum up, the bicycle shifting method described herein is suitable for controlling the gear ratio of the bicycle. According to the bicycle shifting method, the controller storing the gear-ratio table controls the front electronic derailleur, the rear electronic derailleur, or both of the front electronic derailleur and the rear electronic derailleur based on the signal generated by triggering the controlling switch, so as to increase the gear ratio along the speed-increasing path of the gear-ratio table or decrease the gear ratio along the laborsaving path of the gear-ratio table. Note that the speed-increasing path is different from the laborsaving path, so as to prevent the bicycle from increasing or decreasing the gear ratio by frequently switching the front chain ring and the rear chain ring where the chain is located along the same path. By applying the bicycle shifting method, possible damages to shifting parts during the shifting operation of the bicycle may be reduced, and the riding comfort may be guaranteed.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A bicycle shifting method suitable for controlling a gear ratio of a front chain ring and a rear chain ring of a bicycle, the bicycle having a front electronic derailleur, a rear electronic derailleur, a controller, and a controlling switch, the controller storing a gear-ratio table, the bicycle shifting method comprising:

triggering the controlling switch to generate a corresponding signal;

controlling the front electronic derailleur, the rear electronic derailleur, or both of the front electronic derailleur and the rear electronic derailleur by the controller according to the signal, wherein when the signal is a speed-increasing signal, the controller controls the front electronic derailleur, the rear electronic derailleur, or both of the front electronic derailleur and the rear electronic derailleur, so as to increase the gear ratio along a speed-increasing path of the gear-ratio table, when the signal is a laborsaving signal, the controller controls the front electronic derailleur, the rear electronic derailleur, or both of the front electronic derailleur and the rear electronic derailleur, so as to decrease the gear ratio along a laborsaving path of the gear-ratio table, and the speed-increasing path is different from the laborsaving path; and wherein the bicycle has a plurality of the front chain rings and a plurality of the rear chain rings respectively controlled by the front electronic derailleur and the rear electronic derailleur, the bicycle has a chain located on one of the front chain rings and one of the rear chain rings, and the step of controlling the front electronic derailleur, the real electronic derailleur, or both of the front electronic derailleur and the rear electronic derailleur by the controller according to the signal comprises: controlling the front electronic derailleur to move the chain from the one of the front chain rings to another one of the front chain rings, controlling the rear electronic derailleur to move the chain from the one of the rear chain rings to another one of the rear chain rings, or simultaneously controlling the front electronic derailleur to move the chain from the one of the front chain rings to another one of the front chain rings and controlling the rear electronic derailleur to move the chain from the one of the rear chain rings to another one of the rear chain rings.

2. The bicycle shifting method as recited in claim 1, wherein the speed-increasing path has a first switch point, and the step of controlling the front electronic derailleur, the rear electronic derailleur, or both of the front electronic derailleur and the rear electronic derailleur by the controller according to the signal comprises: controlling the rear electronic derailleur to move the chain along the speed-increasing path from the one of the rear chain rings to another one of the rear chain rings; at the first switch point, controlling the front electronic derailleur to move the chain from the one of the front chain rings to another one of the front chain rings.

3. The bicycle shifting method as recited in claim 2, wherein the laborsaving path has a second switch point, and the step of controlling the front electronic derailleur, the rear electronic derailleur, or both of the front electronic derailleur and the rear electronic derailleur by the controller according to the signal comprises: controlling the rear electronic derailleur to move the chain along the laborsaving path from the one of the rear chain rings to another one of the rear chain rings; at the second switch point, controlling the front electronic derailleur to move the chain from the one of the front chain rings to another one of the front chain rings, wherein the first switch point is different from the second switch point.

4. The bicycle shifting method as recited in claim 3, wherein the chain is on one of the rear chain rings at the first switch point, and the chain is on another one of the rear chain rings at the second switch point.

5. The bicycle shifting method as recited in claim 1, wherein the speed-increasing path has a first switch point, and the step of controlling the front electronic derailleur, the rear electronic derailleur, or both of the front electronic derailleur and the real electronic derailleur by the controller according to the signal comprises: controlling the rear electronic derailleur to move the chain along the speed-increasing path from the one of the real chain rings to another one of the rear chain rings; at the first switch point, controlling the front electronic derailleur to move the chain from the one of the front chain rings to another one of the front chain rings and controlling the rear electronic derailleur to move the chain from the one of the rear chain rings to another one of the rear chain rings.

6. The bicycle shifting method as recited in claim 1, wherein the step of controlling the rear electronic derailleur to move the chain from the one of the rear chain rings to another one of the rear chain rings at the first switch point comprises moving the chain along the speed-increasing path from the one of the rear chain rings to another one of the rear chain rings with more gears than those of the one of the rear chain rings.

7. The bicycle shifting method as recited in claim 5, wherein the laborsaving path has a second switch point, and the step of controlling the front electronic derailleur, the rear electronic derailleur, or both of the front electronic derailleur and the rear electronic derailleur by the controller according to the signal comprises: controlling the rear electronic derailleur to move the chain along the laborsaving path from the one of the rear chain rings to another one of the rear chain rings, and at the second switch point controlling the front electronic derailleur to move the chain from the one of the front chain rings to another one of the front chain rings and controlling the rear electronic derailleur to move the chain from the one of the rear chain rings to another one of the rear chain rings, wherein the first switch point is different from the second switch point.

8. The bicycle shifting method as recited in claim 7, wherein the step of controlling the rear electronic derailleur to move the chain from the one of the rear chain rings to another one of the rear chain rings at the second switch point comprises moving the chain along the laborsaving path from the one of the rear chain rings to another one of the rear chain rings with less gears than those of the one of the rear chain rings.

9. The bicycle shifting method as recited in claim 7, wherein the chain is on one of the rear chain rings at the first switch point, and the chain is on another one of the rear chain rings at the second switch point.

* * * * *